Jan. 8, 1952 F. P. GOHOREL ET AL 2,581,405

MARKER-CONTROLLED SELECTOR SYSTEM

Filed Feb. 14, 1947 6 Sheets-Sheet 1

FIG. I.

INVENTORS
FERNAND P. GOHOREL
GABRIEL J. M. PENET

BY Robert Harding Jr.
ATTORNEY

INVENTORS
FERNAND P. GOHOREL
GABRIEL J. M. PENET
BY Robert Harding Jr.
ATTORNEY

MARKER-CONTROLLED SELECTOR SYSTEM

Filed Feb. 14, 1947

INVENTORS
FERNAND P. GOHOREL
GABRIEL J. M. PENET
BY Robert Harding Jr.
ATTORNEY

Jan. 8, 1952 F. P. GOHOREL ET AL 2,581,405

MARKER-CONTROLLED SELECTOR SYSTEM

Filed Feb. 14, 1947 6 Sheets-Sheet 4

INVENTORS
FERNAND P. GOHOREL
GABRIEL J. M. PENET

BY Robert T. Harding Jr.

ATTORNEY

Jan. 8, 1952 F. P. GOHOREL ET AL 2,581,405

MARKER-CONTROLLED SELECTOR SYSTEM

Filed Feb. 14, 1947 6 Sheets-Sheet 5

INVENTORS
FERNAND P. GOHOREL
GABRIEL J. M. PENET
BY Robert Harding Jr.
ATTORNEY

Jan. 8, 1952 F. P. GOHOREL ET AL 2,581,405

MARKER-CONTROLLED SELECTOR SYSTEM

Filed Feb. 14, 1947 6 Sheets-Sheet 6

INVENTORS
FERNAND P. GOHOREL
GABRIEL J. M. PENET
BY Robert Harding Jr.
ATTORNEY

Patented Jan. 8, 1952 2,581,405

UNITED STATES PATENT OFFICE 2,581,405

MARKER-CONTROLLED SELECTOR SYSTEM

Fernand P. Gohorel and Gabriel J. M. Penet, Paris, France, assignors to International Standard Electric Corporation, New York, N. Y., a corporation of Delaware Application February 14, 1947, Serial No. 728,632
In France August 31, 1945

Section 1, Public Law 690, August 8, 1946
Patent expires August 31, 1965

16 Claims. (Cl. 179—18)

This invention relates to telephone systems in which several positioning, directing or marking devices, which may be combined within a register or used as separate units, are provided in common for a group of selectors.

In such systems the marking or control wires must be multipled on the selector banks and also on the marker switches, and special provisions must be made against the establishment of false connections resulting from the simultaneous motion of several selectors under the control of two marking units.

The object of this invention is to prevent incorrect directing or positioning of the selectors.

According to one of the characteristics of the invention the line groups are arranged on the selector bank in the same order as the corresponding control wires of the marker, means being provided to make the stopping circuit of the selector effective only when its wipers engage a predetermined terminal, e. g. the first, with respect to the selected group of terminals, or a special position which immediately precedes the first terminal or is separated from it by no single line of another group (reference position). The selector is stopped on the last line of the selected group if the lines which precede it have been scanned without yielding any result in the course of hunting (because, for instance, they were busy).

Another characteristic of the invention is that the line groups are arranged in the selector bank in the same order as the marker wires of the directing marker unit, means being provided for stopping the selector only when the wipers engage the first terminal or the first group of terminals, or one immediately preceding it (reference position). The stopping circuit is made effective as soon as the selector wipers have scanned, without any result, all the lines of the selected group. The circuit is made operative again when the selector wipers return to the reference position, and this operation is continued until an idle line is found in the selected group.

Special provision is made for the case in which a selector is directed or positioned by two or more marking units, e. g. a primary and a secondary marker. The secondary or higher order marker controls the setting of the selector into a position within a group selected by the primary or lower order marker.

Yet another feature of the invention is the arranging of the stopping positions of the selector controlled by the primary marker in the same order as the corresponding marker wires of the primary marker. Similar arrangements are made for the stopping positions controlled by the secondary marker between two consecutive positions controlled by the primary marker, and so on for the markers of higher order. The stopping circuit of the selector is first under the sole control of the primary marker and is made operative when the selector wipers engage the first line controlled by the primary marker. Once the selector has been directed to the position assigned to it by the primary marker, the stopping circuit is placed under the control of the secondary marker. The selector is stopped on a particular or the last line of the group selected, or its stopping circuit is made inoperative if all the lines of the selected group are busy.

Another characteristic of the invention is the combination of one or several of the above characteristics with a selector having a normal or rest position corresponding to the first terminal of a group or to the one which immediately precedes it.

When the wipers of a selector scan or hunt over the terminals of a group to which they have been directed, and if all the lines are busy, the stopping device must be made inoperative when the wipers move beyond the last line of the group. Without special arrangements false positioning might take place, if the device which makes the stopping circuit inoperative had not completely functioned during passage from the last terminal of the selected group to the first terminal of the following group.

Another feature of the invention resides in the arrangement of the sources of electrical energy needed for the stopping circuit whereby the direction of current flow be reversed in the stopping relay for two consecutive line groups of the selector bank.

The following description and drawings will further clarify the characteristics of the invention. In the drawings:

Fig. 1 diagrammatically shows the elements of a prior art stopping circuit for two selectors of a group, each connected with a marker belonging to a common group, forming part of a telephone system in which the selectors could be incorrectly set;

In the description that follows, contacts closed when the relay with which they are associated is in a normal position, are indicated by prefixing the letter "R" to the reference number of the contact, and those closed when the relay is in an operated position are indicated by prefixing the letter "T" to the reference number. The drawings show a small "x" to designate the prime "′" which is used in the description.

Figure 1:
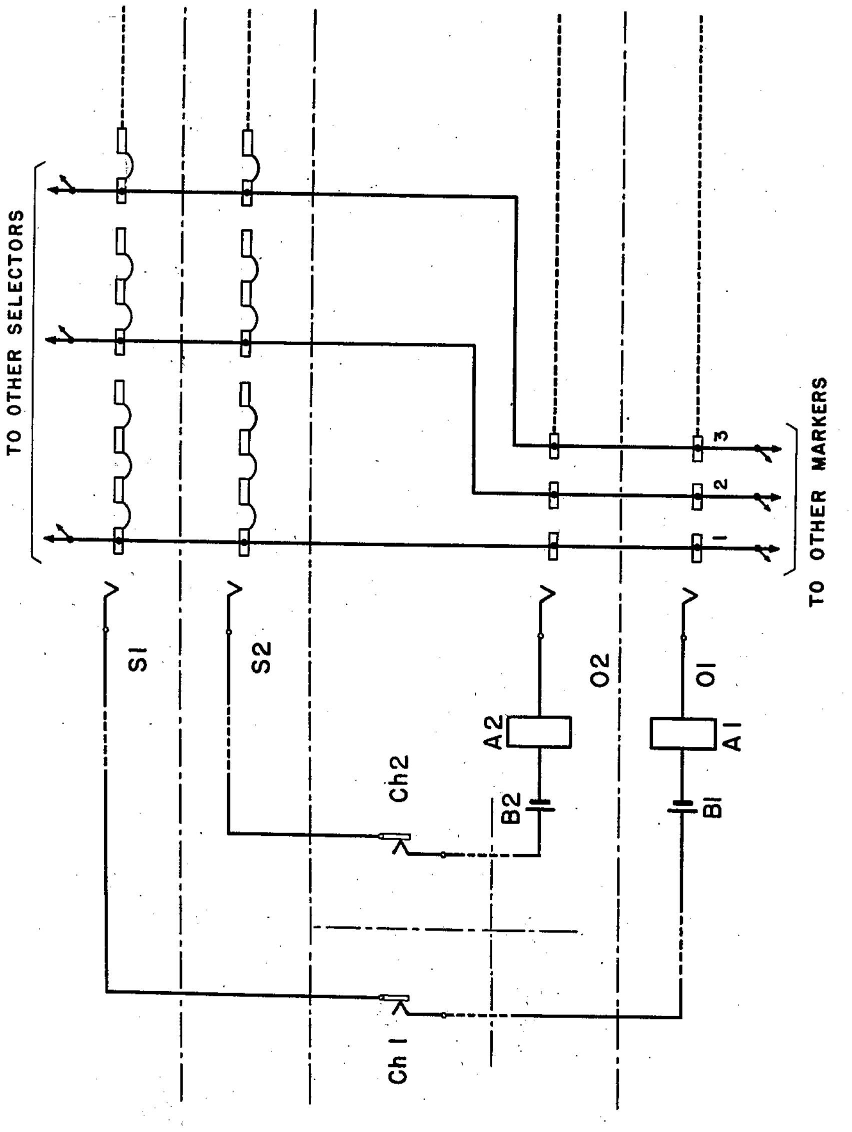

The manner in which incorrect or wrong directing can take place will now be explained, with reference to Fig. 1, which shows the stopping circuit of a selector $S_1$, connected to a marker $O_1$ through a finder $Ch_1$, and a selector $S_2$ connected to a marker $O_2$, through a finder $Ch_2$. Each of the marker stopping circuits has an independent battery ($B_1$ and $B_2$), respectively and a stopping relay ($A_1$ and $A_2$), which act to stop selector $S_1$ or $S_2$.

Selectors $S_1$ and $S_2$ have neither resting, nor normal, nor reference positions. In other words, their wipers remain, after a call has been released, in the position to which they have been directed (non-homing equipment).

It will be assumed that the wipers of marker $O_1$ are in position 1 (digit 1) and the wipers of marker $O_2$ in position 3 (digit 3). The starting circuits of the selectors are closed, and the wipers start moving over the bank contacts. Let us assume that the position of said wipers, when they are started, was such that the wipers of $S_1$ engage the bank contact of the line group which has its marking wire connected to terminal 3 of the markers at the time when the wipers of $S_2$ engage the bank contact of the line group whose marking wire is connected to terminal 1 of the markers. The following circuit is completed: negative pole of battery $B_1$, stopping relay $A_1$, wiper of $O_1$ in position 1, bank contact and wiper $S_2$, finder $Ch_2$, positive terminal and negative terminal of battery $B_2$, stopping relay $A_2$, wiper of $O_2$ in position 3, bank contact and wiper $S_1$, finder $Ch_1$, and positive terminal of battery $B_1$.

Batteries $B_1$ and $B_2$ being connected in series in a circuit which includes stopping relays $A_1$ and $A_2$, said stopping relays attract their respective armatures and cause selector $S_1$ to stop on the terminal marked by $O_2$, and selector $S_2$ to stop on the terminal marked by $O_1$, i. e. incorrectly.

Figure 2:
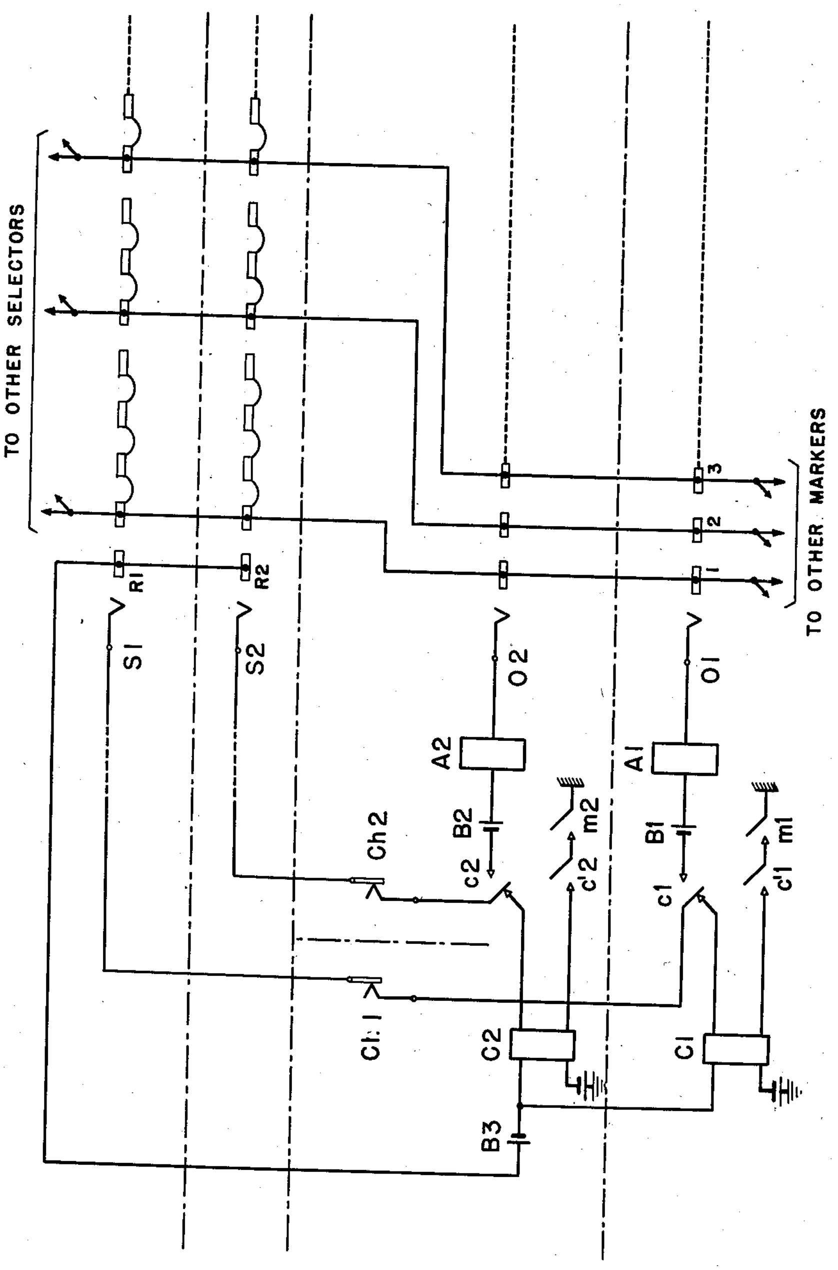
Fig. 2 is an illustration of the same elements as those of Fig. 1, but provided with means to prevent wrong directing of the selectors.

The arrangement of Fig. 2 makes this impossible by providing a reference position $R_1$, $R_2$ in the test terminal row of each selector. This reference position is ahead of the first group of lines connected to the selector.

When selectors $S_1$ and $S_2$ are off their reference positions and are marked, relays such as $C_1$ or $C_2$ are at rest. These relays, with which contacts $c_1$ and $c_2$ are associated, have been provided to close the stopping circuit when the selector wipers are in the reference position. It is assumed, as in the last described case, that the wiper of $O_1$ is in position 1 and the wiper of $O_2$ in position 3.

The wipers of $S_1$ move from its stopping position on, say terminal 6, towards the reference position. When the wipers of $S_1$ reach the bank contacts connected to position 3 of the markers at the time when the wipers of $S_2$ engage the bank contacts connected to position 1 of the marker, there can be no false operation, because the stopping circuit of marker $O_1$ is open at contact $c_1$ of relay $C_1$.

When wiper $S_1$ reaches position $R_1$, the circuit of relay $C_1$ is closed in series with battery $B_3$. Relay $C_1$ attracts its armature and locks up over its contact $c'_1$ and a contact $m_1$, which is closed when the marker $O_1$ is taken into use. Since $A_1$ is deenergized, selector $S_1$ will hunt until it reaches the first line group, whereupon the circuit of relay $A_1$ is completed over $S_1$, $Ch_1$, $c_1$, $B_1$ and $O_1$, causing the selector $S_1$ to stop.

At the end of the conversion contacts $m_1$ of the marker being open, relay $C_1$ releases and opens the stopping circuit of $A_1$.

In case all the lines of the first group are engaged, the holding circuit of $C_1$ is opened after the last bank contact of the group has been passed. When $S_1$ returns to $R_1$, the stopping circuit is reestablished by $C_1$ and the hunting is continued.

This arrangement, which is an object of the invention, thus makes it possible to prevent incorrect directing which would otherwise be possible when the selectors are hunting through line groups following the desired group.

It is obvious that there could be several reference positions in the contact banks at the beginning of each line group. Furthermore, reference position $R_1$ could be replaced by a suitable arrangement to operate relay $C_1$ in the resting or normal position and returning the selector to rest as soon as it is released and after relay $C_1$ becomes deenergized.

The detailed circuit shown in Figs. 3 and 4 will now be explained. In this case, the connections indicated by dashed lines are, and those indicated by crosses are not, made. It is assumed that the reference position is the first position of the selector. Control wires FC are multipled to all the selectors of the group, as well as to the markers used in common by the group of selectors.

An idle selector is characterized by the presence of a battery potential, through resistor $R_e$, on bank contact $T_1$. When the selector is engaged, a ground is placed on bank contact $A_1$, which causes the energizing of relay 21 on its right-hand winding. Ground is then connected over T213 of relay 21 to wire MM causing the energizing of relay 7 via normally closed offnormal contacts $Ob$ and R63 of the first idle marker. The circuit of the driving magnet of a finder $Ch$ associated with the marker is completed: ground, T71, R21, T74, contact $rc$ and the winding of the magnet RC, to battery. The finder $Ch$ is started and, when its wipers reach the terminal V of the selector S, the following circuit is completed: ground, T72, series windings of relay 2, wiper and bank contact V, T214, right-hand and middle windings of 22, left-hand winding of 21, to battery. The windings of relay 2 are energized. At R21 it opens the circuit of the magnet RC, whereupon the call finder $Ch$ stops. At T22, it completes the left-hand winding circuit of relay 6 and the right-hand winding circuit of relay 4 via the normally closed offnormal contact $Oa$, both of which become energized.

At R63, relay 6 opens the circuit of relay 7, which drops its armature. The circuit of relay 2 and 22 is then completed by way of: ground, T61, R71, T21, right-hand low resistance winding of 2, wiper and bank contact V, T214, right-hand winding of 22, left-hand winding of 21, to battery. Relay 22 attracts its armature and relays 2 and 21 are held.

Ground is now connected to wire IE by T63' through the right-hand winding of relay 1, whereby battery impulses applied over bank terminal $B_1$ will operate relay 1 which will repeat the impulses in the following circuit: ground, T22, T11, T44, magnet RO of the marker, to stop the marker wipers. During reception of the impulses relay 4, being shorted out each time the armature of 1 drops off, is none the less holding its armature due to the delay caused by the shorting out. At the end of the reception of the impulse train, relay 4 is shorted out for a long time and drops its armature.

The driving circuit of the selector S is then completed: ground, R51, R12, R82' R43, T64, wiper and bank contact R, T212, contact *rs* and the winding of the magnet RS and battery. If the wipers of the selector are stopped elsewhere than in the reference position, they will move ahead until said position is reached, the stopping circuit being open at T81'.

When wiper C of the selector reaches the reference position, the following circuit is completed: ground on the reference terminal, wiper C, T224', wire and brush C', T62, R41, R81', R72', lower winding of relay 8 and battery. Relay 8 is energized.

When selector wiper C leaves the reference position, relay 8' is energized in series with the lower winding of 8 over T81 and T22.

At T81', relay 8' places the stopping circuit of the marker into operation. The driving circuit of the selector magnet RS is completed by the ground on wire R by way of: R51, R12, T82', T82.

When wiper C of the selector reaches the first bank contact of the group of lines which corresponds to the digit received by the marker O, the following circuit is completed (it will be assumed that digit 2 was dialed): negative terminal of battery $B_1$, wiper *a* of the marker on the second bank contact, winding of relay 3, R71', T81', R41, T62, wiper and bank contact C', T224', selector wiper C, on the first bank contact of the second line group, control wire FC, wiper of the marker in the second position and positive terminal of the battery. Relay 3 is energized and completes the circuit of the left-hand winding of relay 1 at T32. This relay is energized. The circuit of the selector magnet RS is then completed by T12 and T82. When an idle line is found in the second group of lines, a battery is placed on selector wiper $T_2$, which causes the energizing of relay 5 and the return of relay 6 to rest, since its two windings are in opposition of phase. The drive circuit of RS is open at R51 and the wipers of the selector stop on the terminals of the idle line.

When the armature of relay 6 drops off, battery $B_2$ is connected to the circuit of the left-hand winding of relay 21. The voltage of this battery has been so chosen that the current passing through the left-hand winding of 21 gives a flux which is in opposition of phase with that of its right-hand winding, thereby causing the release of said relay.

The selector is then connected by way of R216 and R211 to the circuit seized by wipers $A_2$, $B_2$, contacts T222 and T224 being closed, because relay 22 is locked over its left-hand winding to ground on $T_1$.

By the opening of contacts T213, T214, T211, T212, T215, the marker is released by the circuit: battery, RO, *ro*, marker wiper *c* in positions 1 to 10, R22 and ground.

At the end of the conversation, the selector is released when the ground is removed from contact $T_1$, which deenergizes relay 22.

When all the lines of the selected group are busy, relay 3 drops its armature when selector wiper C has passed the last bank contact of the line group. The circuit of relay 7' is then completed: ground, T22, T83, relay 7', T13, left-hand winding of relay 1 and battery. The stopping circuit of the selector through the marker is open at R71' and will be inoperative while selector wipers engage terminals of the line groups comprised between those to which they have been directed and the reference position. This eliminates the possibility of false direction through the combined circuits of the two markers and two selectors illustrated in Fig. 1.

When selector wiper C returns to the reference position, the upper winding of relay 8 is energized by: ground in the reference position, selector wiper C, T224', bank contact and finder wiper C', T62, R41, T81', T71', upper winding of relay 8 and battery. Since the two winding of the relay are in opposition of phase, it drops off. Relays 1 and 7', the circuit of which is open at T83, drop their armatures. The marker-selector equipment, thus, is at the starting position for hunting, the stopping circuit being again made operative by the closure of R71'.

It will be seen that the selector will continue hunting until released and recloses the stopping circuit each time it returns to the reference position. The selectors could, of course, have several reference positions arranged in their terminal banks according to the distribution of the line groups.

It will be observed that the Battery $B_1$ of each marker is inserted into the control or stopping circuit with its terminals connected reverse to successive marker bank contacts *a* and *b*. This guards against false direction when the selector wipers, after they have scanned a group of busy lines, pass onto the terminals of the following group before relay 3 has had time to fall off.

Figure 4:
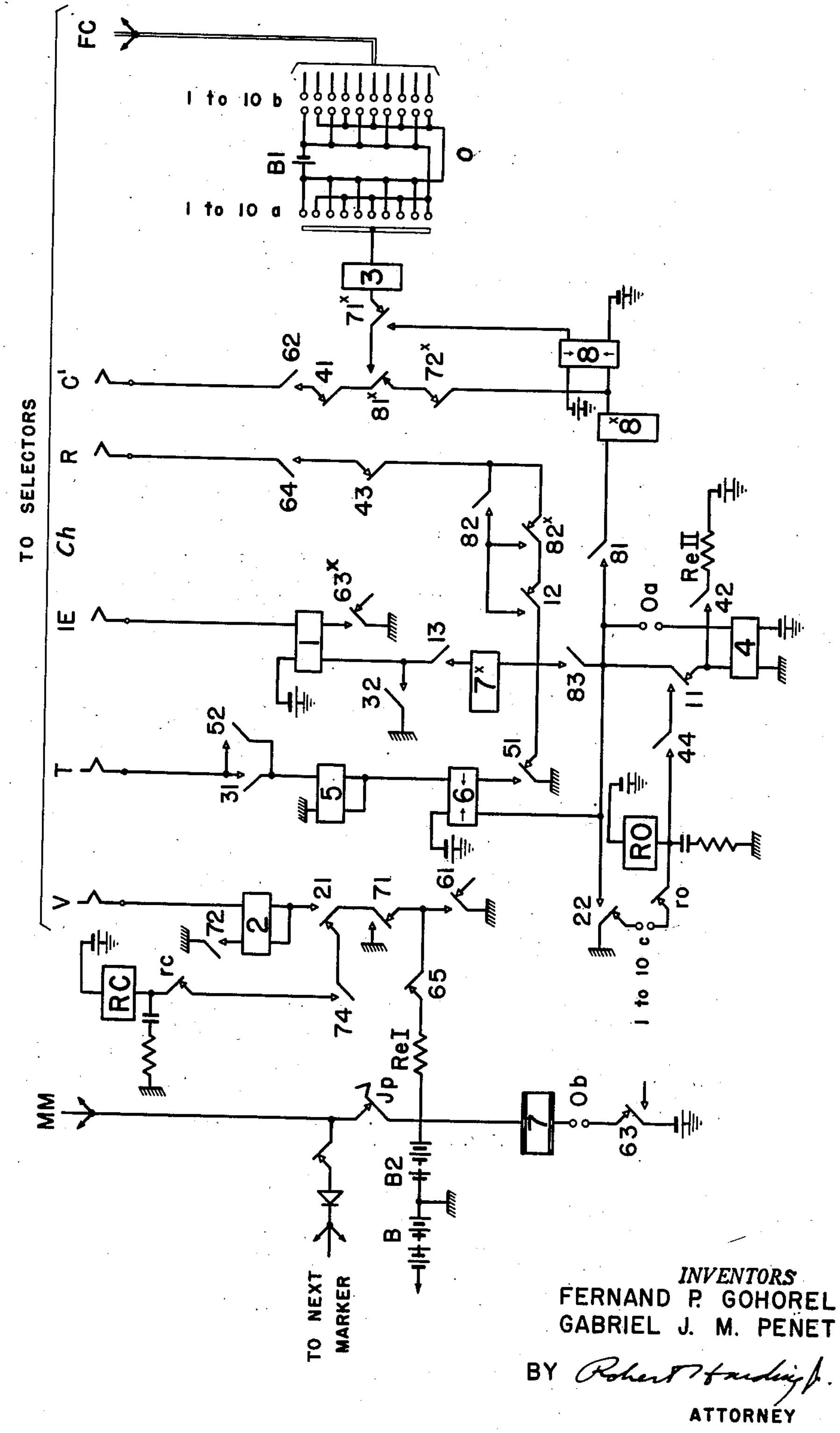
Fig. 4 is a detailed diagram of one of a group of markers arranged to function with selectors having a reference position as in Fig. 3.
Figure 5:
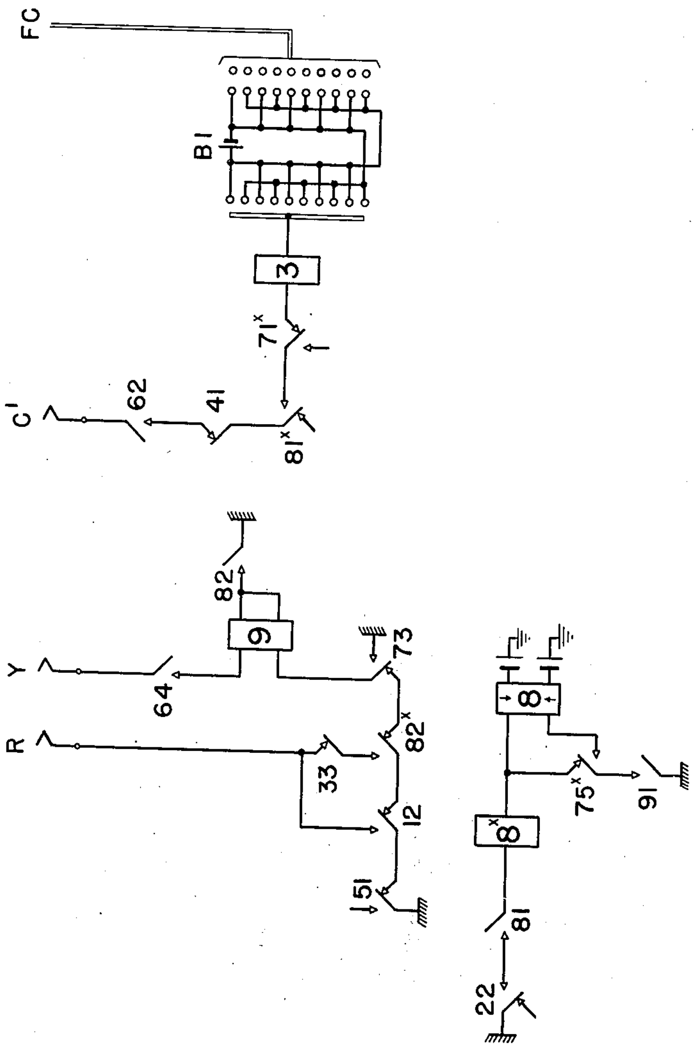
Fig. 5 shows a marker stopping circuit similar to that of Fig. 4, arranged for operation with selectors having a normal or rest position, like Fig. 3.

Fig. 5 shows the manner in which Fig. 4 must be modified when it is desired to activate the stopping circuit when the selector wipers are in their normal or resting position. All the relays shown in Fig. 4 are present with an additional relay 9, while the circuits of relays 8 and 8' are different as are also the contacts of relays 3, 7, 8 and 8'.

Figure 3:
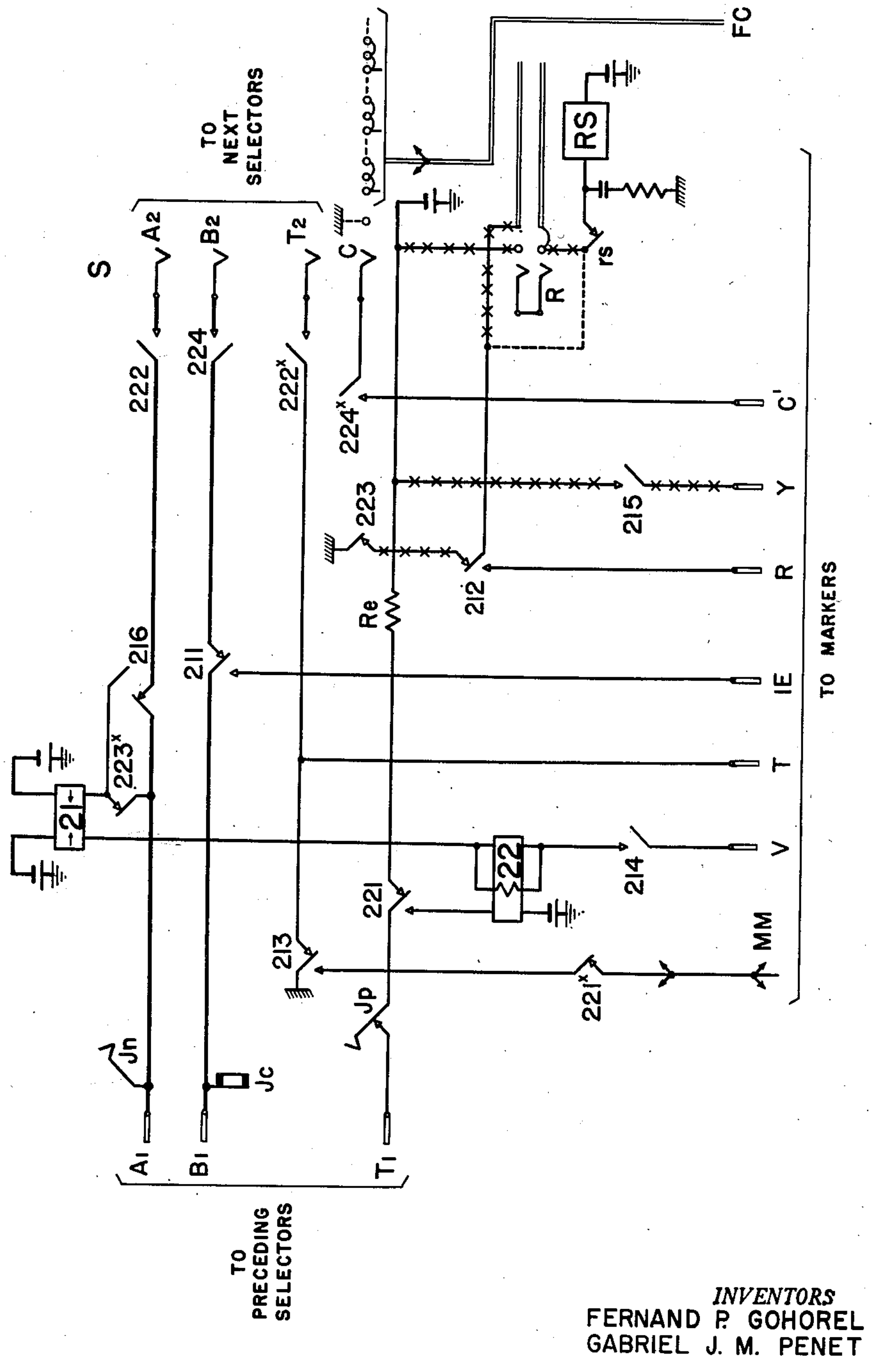
Fig. 3 is a detailed circuit diagram of one of a group of selectors associated with a certain number of common markers having either a normal or a reference position.

Such a selector is shown in Fig. 3 by making the connections identified by crosses and omitting the dashed-line connections.

When the selector is engaged by a call and connected with an idle marker, its wipers being in their normal position, the circuit of relay 9 is completed upon the energization of relay 21. Relay 9 completes the circuit of the upper winding of relay 8, which attracts its armature. A circuit is then closed by way of T82 through the upper, low resistance, winding of relay 9, for magnet RS, which moves the selector out of its resting position. Relay 9 drops off, for its circuit is open, and relay 8' is energized when the short circuit is removed from its winding in T91. The stopping circuit is then closed by T81'. The drive circuit of the selector is completed by: ground, R51, R12, T82', R33, wiper R and T212 of the selector.

When the selector wipers reach the desired line group to be scanned, relay 3 is energized and energizes relay 1, as explained in connection with Fig. 4. The circuit of RS is completed by way of: R51, T12. If an idle line is found, the test and the stopping take place in the normal way. If all the lines are busy, relay 3 drops off when the wipers of the selector leave the group, and causes the energizing of relay 7' (Fig. 4), as has been explained. At R71' the circuit of relay 3 is opened and the stopping circuit is made inoperative.

When the wipers of the selector return to the resting position, relay 9 is reenergized. Through T91 it completes the circuit of the lower winding of 8 through 75'. Differential relay 8 drops its armature. Relays 8' and 1 drop their armatures and the circuit is in the same position as before. The stopping circuit is again activated and hunting continues.

At the end of the conversation the selector is released when ground is removed from contact T1, which de-energizes relay 22. The selector wipers are moved to the home position in a circuit from ground, R223, wipers and bank terminals R, contacts *rs*, magnet RS to battery.

Figure 6:
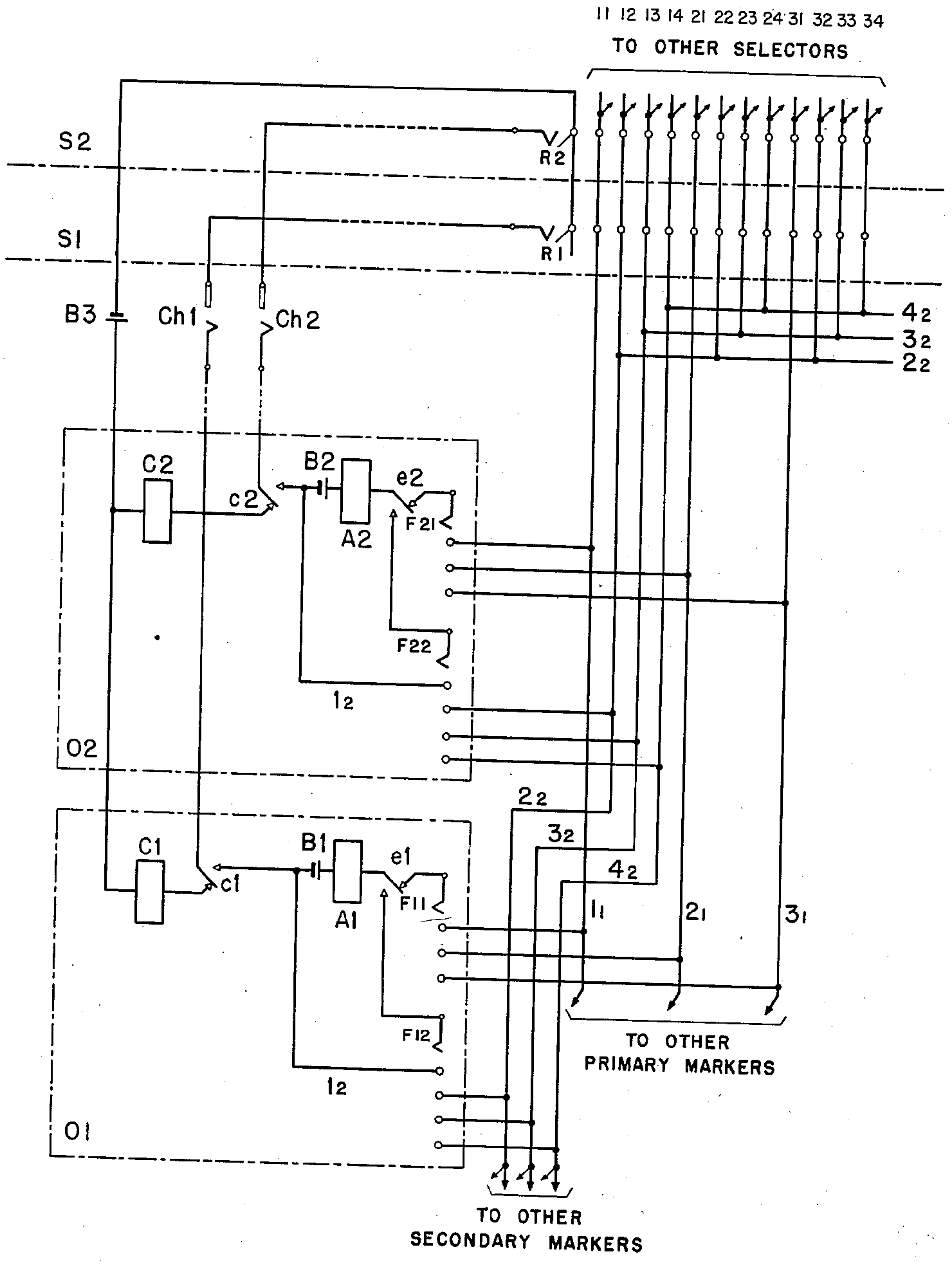
Fig. 6 shows the directing circuit of a selector such as a final selector or connector directed by two markers.

In Fig. 6 the circuit is the same as in Fig. 2 except for additional connections for controlling the primary and secondary markers. Relays C2 and C1 are connected in the same manner as in Fig. 2, but the locking circuits therefore have not been shown.

The primary control wires $1_1$, $2_1$, $3_1$, in the circuit shown in Fig. 6, which determine the primary groups, are multipled in the direction in which the marker moves on the first terminals in each primary group of the selector bank. For instance, in the case of a one-hundred point final selector, the control wires, which correspond to the tens, are multipled to the first terminals of the corresponding tens group of all final selectors, such as $S_1$, $S_2$, and also to the terminals of the primary markers F11, F21. Similarly, the secondary control wires $2_2$, $3_2$, $4_2$ are multipled to the corresponding terminals of each primary group. For instance, in the case of a one-hundred point final selector, these wires correspond to the units and are multipled each to ten terminals of each selector such as $S_1$, $S_2$, and also the banks of the secondary markers F12, F22.

During the first selection, when the wipers of the selector, e. g. $S_1$, reach reference position $R_1$, relay $C_1$ is energized and places over its work contact $c_1$ the stopping circuit of selector $S_1$ under the control of primary director $F_{11}$, through rest contact $e_1$, relay $A_1$ and battery $B_1$. When selector $S_1$ finds the marked position—21 for instance—relay $A_1$ is energized and controls the stopping of the selector and the moving (by well known means not illustrated) of contact $e_1$ to its working position. The stopping circuit of selector $S_1$ is now under the control of the secondary marker $F_{12}$. The wipers of selector $S_1$ are started again and stopped when they find the position marked by the secondary marker, whereupon the circuit of relay $A_1$ is again closed, in position 23 for instance, over control wire $3_2$, $F_{12}$ in position 3, work contact $o_1$, relay $A_1$, battery $B_1$, work contact $c_1$, finder $Ch_1$ and wiper of selector $S_1$.

When the called number ends with "1," there is no second positioning or directing of the selector, since relay A is energized again immediately after the first direction over wire 1.

Obviously, without exceeding the scope of the invention, reference positions could be provided in selectors having rest positions, and batteries B, $B_1$ and $B_2$ could be replaced by any other suitable source.

What is claimed is:

1. In an automatic switching system, means for establishing connections between calling and called lines comprising a selector having groups of terminals and at least one reference terminal, wipers for said terminals, means for moving said wipers over said terminals, a marker having a plurality of contacts, means for causing said marker to select a contact, marker wires multipled to said selector terminals and said marker contacts, a normally ineffective circuit including the marker wire connected to the selected marker contact for stopping said wiper-moving means, and means for making said stopping circuit effective only after said selector wipers have moved over a reference terminal.

2. The system according to claim 1, further comprising means for making said circuit ineffective when the selector wipers have passed over all the terminals of the selected group, and means operative thereupon for moving said wipers to said reference terminal.

3. In an automatic switching system, means for establishing connections between calling and called lines comprising a selector having groups of terminals and at least one reference terminal, wipers for said terminals, means for controlling the stopping of the movement of said wipers over said terminals, a marker having a plurality of contacts, marker wires multipled to said selector terminals and said marker contacts, a normally ineffective circuit for energizing said controlling means, means for including in said circuit a selected one of said marker wires, and means for making said circuit effective only after said selector wipers have moved over a reference terminal.

4. The system according to claim 3, further comprising means for making said circuit ineffective when the selector wipers leave the last terminal of the selected group.

5. In an automatic switching system, the combination, according to claim 1, in which the circuit for stopping the wiper-moving means includes a relay associated with the marker with its operating circuit including contacts of the marker, further comprising current supply connections for the relay circuit, and means for alternately reversing said current supply connections through successive marker contacts.

6. The system according to claim 1, and in which each marker comprises a primary and a secondary marker, the marker wires multipled to the contacts of the primary markers being multipled to a predetermined selector terminal in each group, and the marker wires multipled to the secondary marker contacts to the other selector terminals, and means first under the sole control of the primary marker and, after the setting of the selector under the control of the secondary marker for making effective the stopping circuit.

7. The system according to claim 3, and in which the reference terminal is the first terminal of the group.

8. The system according to claim 3, and in which the reference terminal precedes the first terminal of the selected group.

9. The system according to claim 3, and in which each selector has a normal resting position from which it is moved under the control of the marker, and means operative upon the termination of the connection for moving the operated selector into its normal position.

10. The system according to claim 3, and in which upon the termination of the connection the selector remains set in the position into which it was moved under the control of the marker.

11. In an automatic switching system, means for establishing connections between calling and called lines comprising a plurality of selectors each having groups of terminals arranged in a certain numerical order and at least one reference terminal and each having wipers for said terminals and means for moving said wipers over said terminals, a plurality of markers each having groups of terminals arranged in the same numerical order as the selector terminals and means for causing said marker to select a contact, marker wires multipled to said selector terminals and said marker contacts, a normally ineffective circuit including the marker wire connected to a selected marker contact for stopping each wiper moving means, means operative only after the selector wipers have moved over the reference terminal of the selected group thereof for making said stopping circuit effective, means for making said circuit ineffective when the selector wipers have passed over the terminals of the selected group, and means operative thereupon for moving said wipers to said reference terminal.

12. The system according to claim 11, and in which each selector has a normal position from which it is moved under the control of the marker, and means operative upon the termination of the connection for moving the operated selector into its normal position.

13. The system according to claim 11, further comprising means for making said circuit ineffective when the selector wipers are moving from the last terminal of the selected group to said reference terminal.

14. In an automatic telephone system, the combination, according to claim 11, in which the circuit for stopping the wiper-moving means includes a relay associated with the marker with its operating circuit including contacts of the marker, further comprising current supply connections for the relay circuit, and means for alternately reversing said current supply connections through successive marker terminals.

15. The system according to claim 11, in which each of the markers include primary and secondary markers, the marker wires multipled to the terminals of the primary markers being multipled to a predetermined selector terminal in each group, and the marker wires multipled to the secondary marker to the other selector terminals, and further comprising means first under the sole control of the primary marker and, after the setting of the selector, under the sole control of the secondary marker for making effective the stopping circuit.

16. In an automatic switching system, the combination, according to claim 3, in which the means for making the circuit effective only after the selector wipers have moved over a reference terminal includes a relay for said selector having contacts in said circuit and a circuit for controlling said relay including the wiper of said selector.

FERNAND P. GOHOREL.
GABRIEL J. M. PENET.

REFERENCES CITED

The following references are of record in the file of this patent:

UNITED STATES PATENTS

| Number | Name | Date |
|---|---|---|
| 1,902,187 | Saunders | Mar. 21, 1933 |
| 1,956,371 | Christian | Apr. 24, 1934 |
| 2,087,405 | Humphries | July 20, 1937 |
| 2,153,306 | Hensler | Apr. 4, 1939 |
| 2,423,098 | Gohorel | July 1, 1947 |